United States Patent [19]

Tanaka

[11] 4,447,958
[45] May 15, 1984

[54] TOUCH SENSOR

[75] Inventor: Yuzuru Tanaka, Higashiosaka, Japan

[73] Assignee: Daishowa Seiki Co., Ltd., Osaka, Japan

[21] Appl. No.: 353,265

[22] Filed: Mar. 1, 1982

[30] Foreign Application Priority Data

Mar. 18, 1981 [JP] Japan .................. 56-38899

[51] Int. Cl.³ ............................ G01B 7/00
[52] U.S. Cl. ................. 33/174 L; 33/169 R
[58] Field of Search ............ 73/862.53; 200/6 A, 200/61.42; 33/169 R, 174 L

[56] References Cited

U.S. PATENT DOCUMENTS 4,145,816  3/1979  Stobbe et al. .......... 33/174 L
4,230,916 10/1980  Mochizuki ............. 200/6 A

FOREIGN PATENT DOCUMENTS 0794361  1/1981  U.S.S.R. ............. 33/169 R

Primary Examiner—Charles A. Ruehl
Attorney, Agent, or Firm—Gabriel P. Katona

[57] ABSTRACT

A touch sensor which is used to examine the machining accuracy of articles to be worked or used in a numerical control tool machine with an automatic tool converter (ATC) known as the machining center comprising a sensor rod which contacts the workpiece and detects the position to be worked, a plunger which shifts the displacement of the sensor rod to a rectilinear motion, a globe joint portion which is provided between the sensor rod and the plunger, a flange portion provided at the rear end portion of the sensor rod and a sensing device connected to the flange portion. In the touch sensor of the present invention, the displacement of the sensor rod is detected with the sensing device through the flange portion, the detecting signals are transmitted to a memory or the numerical control tool machine and in this way the machining accuracy of the workpiece or position to be worked can be detected automatically and exactly.

10 Claims, 9 Drawing Figures

TOUCH SENSOR

BACKGROUND OF THE INVENTION

The present invention relates to a touch sensor which is used as a measuring device, and particularly to a touch sensor which is used to examine the machining accuracy of worked products or is used in a numerical control tool machine with an automatic tool converter (ATC) known as the machining center. This touch sensor may be housed in the tool magazine of said machining center when it is not in use and is attached to the spindle when required after being taken out from the magazine with a manipulator, then the headstock is moved properly to make a contact directly with the workpiece and the position to be worked, for example, the distance to the end face to be worked, the size of the hole to be worked and so on are detected and finally the detecting signals are sent to the control device.

Conventionally, various types of touch sensors of this kind have been proposed. A typical structure of those touch sensors is such that a sensor rod is held at a definite position only with a spring means, the sensor rod is displaced against said spring means when the sensor rod has contacted the workpiece, and the displacement signal is detected with a sensing device.

Holding the sensor rod only with a spring means in this way will bring about difficulties in displacing and operating the sensor rod exactly. As a result, it will be difficult to detect the exact position to be worked of the workpiece.

Therefore, the first object of the present invention is that not only holding the sensor rod at a definite position on the casing in such a manner that the rod is centered very exactly, but also detecting exactly the position to be worked of the workpiece having the sensor rod displaced sensitively and exactly when the sensor rod has contacted to the workpiece.

The second object of the present invention is to provide a touch sensor wherein not only the shock generated when the sensor rod contacts to the workpiece is alleviated to prevent the sensor from breaking or failing, but also both conductive and non-conductive workpieces are used and yet the mounting and operating of the sensor may be easy.

BRIEF SUMMARY OF THE INVENTION

In order to achieve the objects mentioned above, according to the present invention, a cylindrical casing is formed integrally with a holder. A plunger and a sensor rod are provided coaxially in said casing through a universal or globe joint portion. A contact is provided at the top of the sensor rod, and said contact is made to project from an opening at the top of the casing. A flange is provided integrally at the rear portion of said rod. With the exciting force of a coil spring for pressing a plunger, the sensor rod is pressed through the globe joint portion, and a peripheral portion of the flange is pressed to a place which corresponds to said peripheral portion of the casing. Therefore, the sensor rod recedes in the axial direction against the spring for pressing the rod upon receiving the load in the axial direction as a result of a contact with the object to be worked, and moves pivotally around the globe joint portion upon receiving the load in a direction perpendicular to the axial direction. Therefore, the sensor rod according to the present invention can be prepared for a motion of escape against the overload upon contacting the object, so that the contact, sensor rod and related members can be prevented from breaking and failing.

Moreover, according to the present invention, the globe joint portion which serves as the pivotal supporting point of the sensor rod is positioned at a place where it is nearer to the center of the flange on the axial line of the plunger and sensor rod, so that the displacement of said peripheral portion of the flange in the diametric direction with respect to the portion corresponding to the peripheral portion of the flange is small in the pivotal movement of the rod, and the flange is permitted to return quickly to the original position following the recovering motion of the sensor rod. And yet simplification and compactification of the structure have become possible by making the contact areas of the peripheral portion of the flange and its corresponding portion on the casing relatively narrower.

Yet according to the present invention, the plunger which shifts the displacement of the sensor rod to a rectilinear motion is held movably in the axial direction by means of ball bearings, so that said plunger can follow the displacement sensitively and exactly without exerting unnecessary resistance against the displacement of the sensor rod.

Moreover, according to the present invention, at least three terminals connected to a sensing device are spacingly provided in the peripheral direction at a position which corresponds to said peripheral portion in the casing. In the present invention, an induction transformer comprising a primary winding connected to the power source and a secondary winding connected to terminals is adopted. The primary winding is connected to said terminals, and the secondary terminals, for example, to a control device of the machining center. The sensor rod is made to move pivotally as a result of a contact's contacting the workpiece, and at the same time the flange is made to turn inclinatorily to separate a part or the whole of a switch comprising the peripheral portion of said flange and each terminal, then a change of the mutual reactance thereby is detected. With such a structure, it is possible to detect the position to be worked of the workpiece irrespective of the workpiece's being conductive or non-conductive. Particularly in applying the sensor to the machining center, human powers are not required in the operation for connecting the holder to the headstock in order to mount the touch sensor of the present invention, because an induction transformer is provided between the holder side which is a rotatable body and the headstock side which is a stationary body. That is, according to the present invention, the operation for connecting the holder to the headstock may be carried out with a manipulator automatically and simultaneously with the mounting operation of the sensor.

Moreover, in the present invention, a light emitting means which operates and goes on and off with the displacement of said sensor rod and a photo-receiving means which receives the ons-and-offs of the light emitting means are adopted as the sensing device, wherein the photo-receiving signals from the photo-receiving means are transmitted to the control device of the machining center, and the position to be worked can be detected automatically by the commands from said control device.

Other objects and accompanying advantages of the present invention will become apparent from the description of the embodiments wherein reference is made to the accompanying drawing.

DESCRIPTION OF THE PREFERRED EMBODIMENTS

Figure 1:
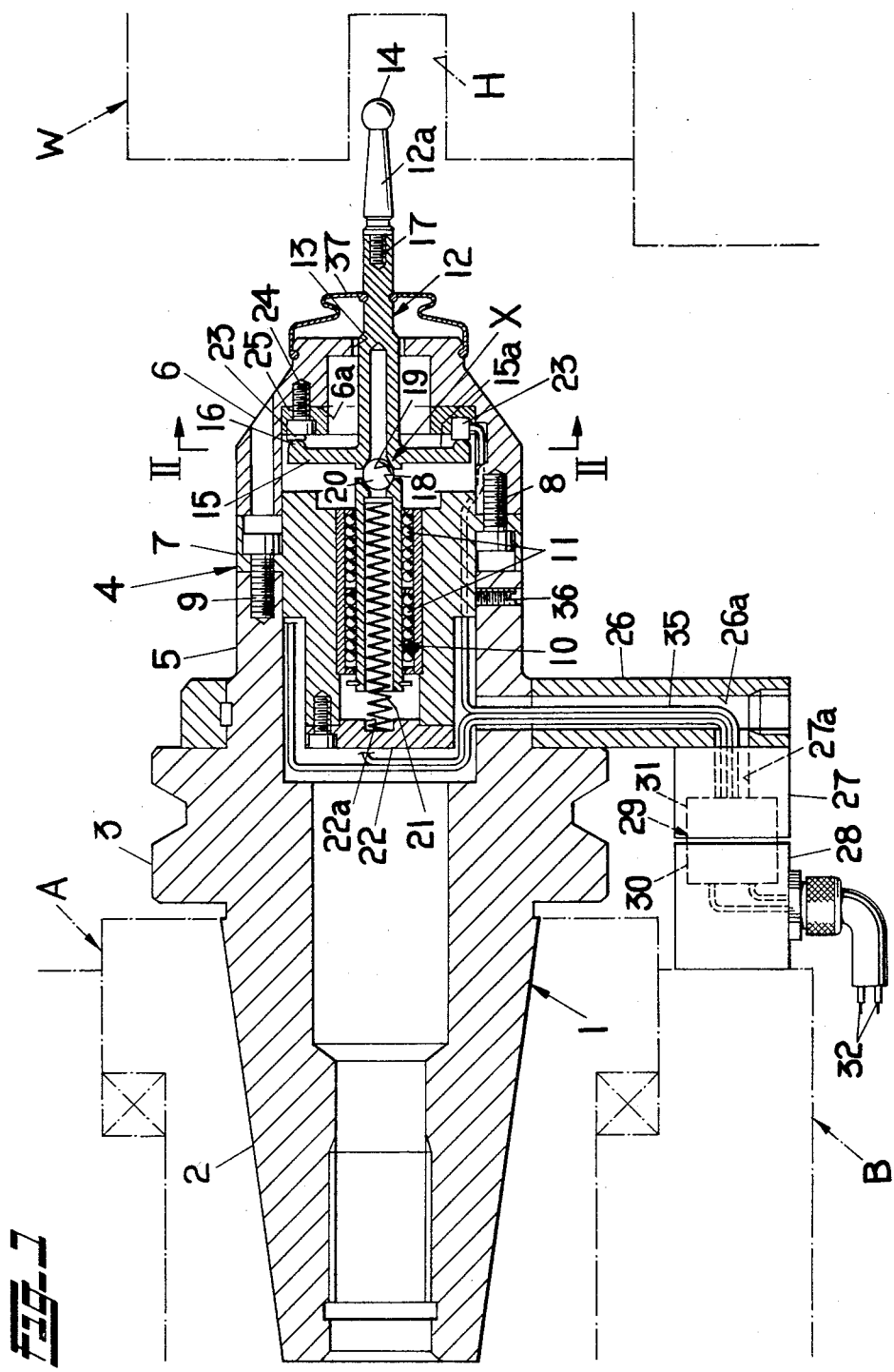
FIG. 1 is a longitudinal section showing an embodiment of the touch sensor according to the present invention.
Figure 2:
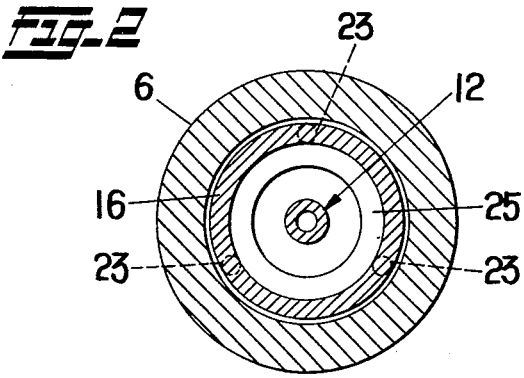
FIG. 2 is a sectional view taken along the line II—II of FIG. 1.
Figure 3A:
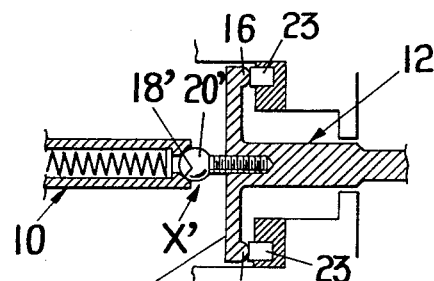
FIGS. 3(A), 3(B) are sectional explanatory views showing other embodiments of the globe joint portion.
Figure 3B:
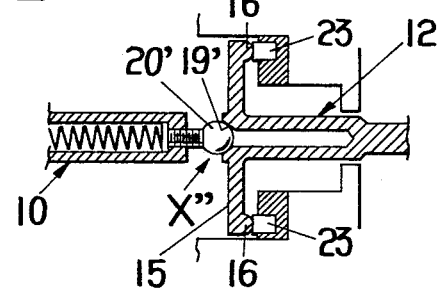

In FIG. 1, numeral 1 designates a holder comprising a tapered shank portion 2 mounted on a main spindle A of the machining center (not shown in the drawing) and a grasp portion 3 grasped by a manipulator (not shown in the drawing). Numeral 4 designates a cylindrical casing connected integrally and coaxially with the holder 1, which comprises a rear cylindrical member 5 formed integrally with the grasp portion 3 of the holder 1, a tapered front cylindrical member 6, and a cylindrical support member 7 provided between both rear and front cylindrical members 5 and 6. The front cylindrical member 6 is connected integrally to the support member 7 with a bolt 8. The support member 7 is connected integrally to the rear cylindrical member 5 with a bolt 9. In this way the rear cylindrical member 5, the support member 7 and the front cylindrical member 6 are coaxially connected with one another. Numeral 10 designates a plunger which passes through the support member 7 in the casing 4 in its axial direction and is supported by slide ball bearings 11, 11 so as to move in the axial direction. Numeral 12 designates a sensor rod, which is provided in the front cylindrical member 6 of the casing 4 opposingly to the plunger 10 and coaxially therewith and passes through an opening 13 at the top of said cylindrical member 6 to project outside thereof. The sensor rod 12 is provided with a contact 14 having a spherical shape or other proper shape at its projecting outer end. At the rear end of the sensor rod 12, a flange 15 is provided integrally, and at a front peripheral portion 15a of said flange 15, an annular projecting portion 16 is formed integrally. The sensor rod 12 is provided with a joint, for example, a threaded joint 17, halfway thereof so that its length may be changed properly as occasion demands, so that a member having a proper length may be substituted for a portion 12a which ranges from the joint portion 17 to the contact 14. Tapered concavities 18, 19 are formed respectively at the opposed ends of the plunger 10 and the sensor rod 12, namely, at the front end of the plunger 10 and the rear end of the sensor rod 12. A globe 20 is engaged between the tapered concavities 18, 19, and these tapered concavities 18, 19 and the globe 20 form a globe joint portion X. Numeral 21 designates a coil spring for pressing the plunger, inserted in the plunger 10, and one end thereof is supported by the innermost end of said plunger 10, and the other end is supported by a concave portion 22a of a plate 22 fixed at the rear end of the support member 7. The coil spring 21, when excited, not only pushes forward the sensor rod 12 through the globe jount portion X, but also pushes the annular projecting portion 16 of the flange 15 toward a conductive connecting terminal 23 provided at the casing 4 side. As shown in FIG. 2, connecting terminals 23 are provided three or more in number spaced apart equally in the circumferential direction in an annular insulator 25 made of bakelite etc. fixed with a bolt at a stepped portion 6a on the inner wall of the front cylindrical member 6. Normally the annular projecting portion 16 contacts all of the terminals 23 simultaneously, which, however, contacts only a part of the terminals 23, or otherwise, gets separated from all of the terminals when the sensor rod 12 oscillates around the globe joint portion X or when the rod 12 bears a load in the axial direction against the excitation of the coil spring 21. Incidentally, as mentioned hereinbefore, the globe joint portion X is structured in such a manner that tapered concavities 18, 19 are provided respectively at the opposing ends of the plunger 10 and sensor rod 12 to insert the globe 20 therein. With respect to the globe joint portion, such variations shown in FIG. 3(A) under a signal X' and FIG. 3(B) under a signal X" are also acceptable. That is, in the former case, a tapered concavity 18' is provided only on the plunger 10 side and a globe portion 20' integrally on the sensor rod 12 side. In the latter case, the globe portion 20' is provided integrally on the plunger 10 side and a tapered concavity 19' on the sensor rod 12 side. Such globe joint portions X', X" require only such a few parts that they are advantageous in that productions thereof at a low cost are possible.

It is preferable that the globe joint portion X be located at the central portion of the flange 15 as far as it is possible. It is because when the globe joint portion X exists at the central position of the flange 15 or near it, the displacement of the related place of the annular projecting portion 16 which presses and contacts any of the terminals 23 with respect to said terminal 23 in the diametric direction is small to an extent that no trouble is caused, even if the angle of inclinatory rotation of the flange 15 is a little big in the pivotal motion of the sensor rod 12. To the contrary, the farther from the central position of the flange 15 the globe joint portion X rests, the bigger said displacement is, and here arise inconveniences, for example, not only does it take much time for the flange 15 to return to the original position, but also the contact surfaces of both the terminals 23 and the annular projecting portion 16 must be large in order to prevent the annular projecting portion from slipping off the terminals.

Figure 4:
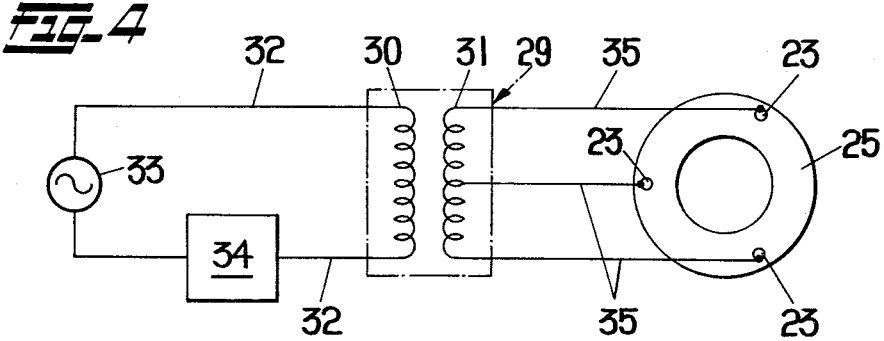
FIG. 4 is an electrical circuit diagram showing a part of the induction transformer of the embodiment illustrated in FIG. 1.

Numeral 26 designates a hollow support arm mounted to the rear cylindrical member 5 of the casing 4 in such a manner that it projects rectangularly against the axial direction of said cylindrical member. At the top of the hollow support arm 26, a hollow support member 27 on the casing side is provided rectangularly against said support arm in such a manner that it projectingly opposes to the end face of the headstock B. Numeral 28 is a hollow support member on the headstock side provided at a required position on the headstock B side opposing to said support member 27. A primary winding 30 is provided at the top of the support member 28 on the headstock side and a secondary winding 31 at the top of the support member 27 on the casing side respectively to form an induction transformer 29 as a sensing means. As shown in FIG. 4, the secondary winding 31 forms the secondary circuit by having both its ends and intermediate portions connected respectively to each of the three terminals 23, 23, 23 in the casing 4 through cords 35, 35, 35, while the primary winding 30 forms the primary circuit which is connected in series to an electric source 33 and a control device 34 of the machining center through cords 32, 32. The connecting cords 35, 35, 35 in the secondary circuit are, as shown in FIG. 1, extended into the rear cylindrical member 5 in the casing 4 through respective inner cavities 27a, 26a of the support member 27 on the casing side and the support arm 26 in the form of a bundle, where said cords are diverged and connected to each of the terminals 23.

In the drawing, numeral 36 is a threaded screw for controlling the centering of the sensor rod provided in the rear cylindrical member 5. When the central axial line of the sensor rod 12 is deviated with respect to that of the holder 1, said screw 36 is tightened while making properly eccentric the front cylindrical member 6 which is engaged in said cylindrical member 5 so that the axial line of the sensor rod 12 might coincide with that of the holder 1. Numeral 37 is a dust cover which is made of a flexible material such as rubber and is put on the top of the front cylindrical member 6 to prevent the dust from getting in the sensor. The holder 1, the casing 4, the plunger 10, the sensor rod 12 and the globe portion X are made of conductive materials.

Explanations about the operation of the touch sensor constructed as mentioned above will be given hereinafter. For example, in carrying out work to tap a workpiece W, the exact position for a prepared hole H must be detected to tap a workpiece W prior to drilling of the hole H. To attain this purpose, the first step is to fix the holder 1 on the main spindle A of the machining center. Then the operator makes the contact 14 at the top of the sensor rod 12 contact the inner wall of the prepared hole H of the workpiece W, moving the headstock B vertically and horizontally (from side to side and back and forth). Though slightly, the sensor rod 12 moves pivotally around the globe joint portion X the very moment said contact 14 comes into contact with the inner wall of the prepared hole H. As a result, the flange 15 which has kept its transverse position so far and pushed the conductive annular projecting portion 16 to all of the three terminals 23, 23, 23 inclines and ceases keeping its vertical position, so that any of the three terminals 23, 23, 23 becomes separated from the annular projecting portion 16 of said flange 15. When the contact 14 does not contact the inner wall of the prepared hole H, namely, when neither the pivotal movement of the sensor rod 12 nor the inclined movement of the flange 15 is caused, each of the terminals 23 contacts the projecting portion 16 of the flange 15 as a result of the flange 15 being pressed toward the terminals 23 side as mentioned hereinbefore, then a kind of switch which is composed of the terminals 23 and the projecting portion 16 operates to turn on, when the secondary circuit of the induction transformer 29 as shown in FIG. 4 is closed. Accordingly, when the primary winding 30 is charged with electricity by the electric source 33, the secondary current which is determined by the turn ratio of the primary winding 30 to the secondary winding 31 passes through the secondary current due to the function of the mutual flux, as is known well. On the other hand, a fixed quantity of primary current passes through the primary circuit as long as said secondary circuit is closed. But, as mentioned above, the contact of the contact 14 to the inner wall of the prepared hole H causes the inclined rotation of the flange 15 to separate either of the three terminals 23, 23, 23 or all of them from the annular projecting portion 16. Then the secondary circuit is opened and the secondary current is not induced through the secondary winding 31, so that the mutual reactance between the primary circuit and the secondary circuit changes and this change of the mutual reactance permits the impedance of the primary winding 30 to be varied, and as a result, the current value of the primary current also varies. The change of the current value of the primary current is read at the control device 34 of the machining center, from which a stop signal is sent, for example, to the drives of the headstock B to stop said headstock B, and the position to be worked is detected. In this case, the headstock B overruns more or less because it cannot stop immediately even if a stop instruction for the headstock is sent from the control device to the drives as a result of the contact of the contact 14 to the workpiece W. In such a case, if the sensor rod is supported immobilizingly, the rod is liable to suffer from deformation since excessive torque or compressive load affects it. To the contrary, with respect to the touch sensor according to the present invention, the sensor rod 12 is movable in the axial direction and can move in the direction perpendicular thereto and pivotally with respect to the globe joint portion, so that the sensor rod 12 can be prepared for an escape before the rod suffers from the deformation. That is, when the contact 14 receives the downward load perpendicular to the axial direction, the sensor rod 12 oscillates in the clockwise direction around the globe joint portion X against the excitement of the coil spring 21. When the contact 14 receives the load in the axial direction, said rod 12 recedes in the axial direction against the coil spring 21. Then if the operator draws apart the touch sensor from the workpiece W after the position-detecting operation has been completed, the sensor rod 12 can return to the original position with the help of the recovering force of the coil spring 21.

Figure 5:
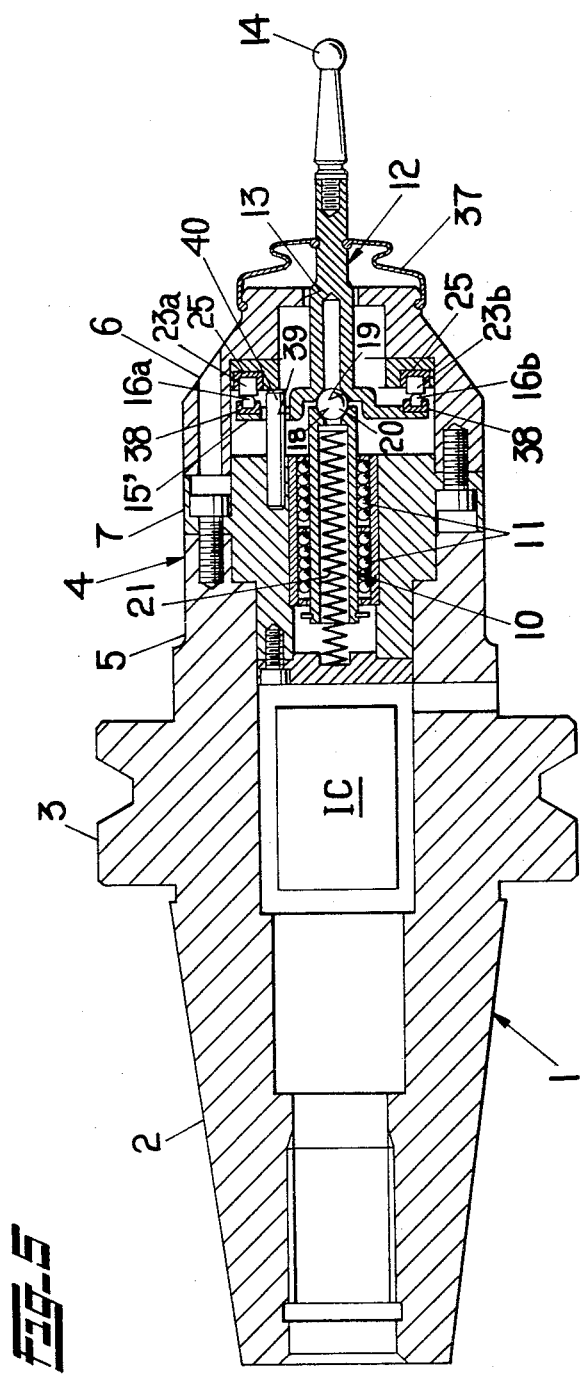
FIG. 5 is a longitudinal section showing another embodiment of the present invention.
Figure 7:
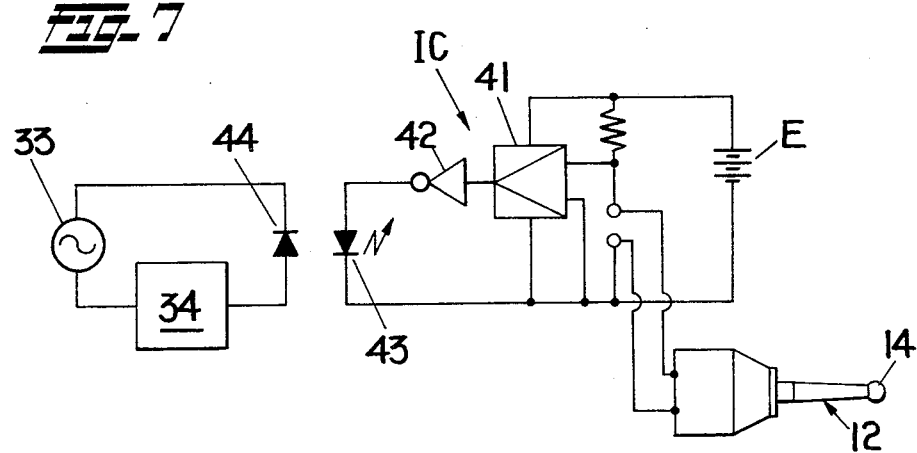
FIG. 7 is an electronic circuit diagram of the sensing device of the embodiment shown in FIG. 5.

FIGS. 5 and 7 show another embodiment of the present invention. To the same constituent elements of the embodiment mentioned above, the same reference numerals and signals apply and explanations thereof are omitted. With respect to the several aspects of the structure which differ from those of the above-mentioned embodiment, explanations will be given hereinafter.

In the present embodiment, points of contact 16a, 16b, 16c are provided on a flange 15' through an insulator 38 correspondingly with other points of contact 23a, 23b, 23c provided on a body 25 with an insulating property at three places spaced equally in its circumferential direction, and a stopper 40 is engaged in a vertical slot 39 formed on a flange 15' lest each of these corresponding elements should get out of position.

Figure 6A:
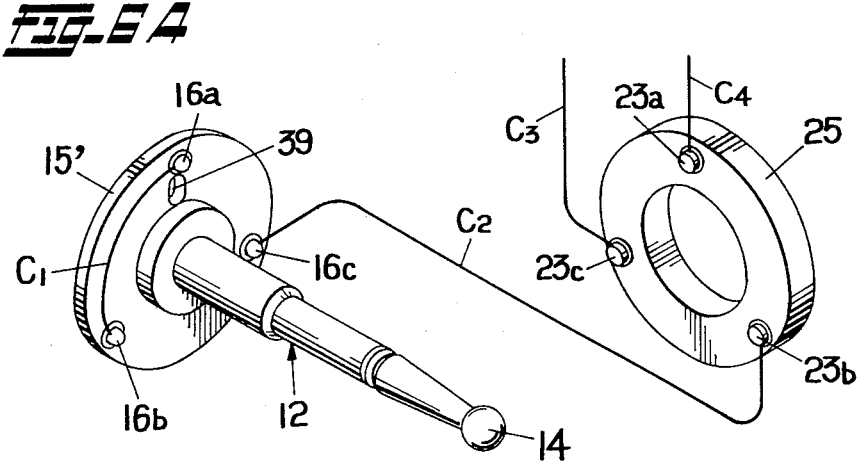
FIG. 6a is a perspective illustration wherein the main part of the embodiment has been exploded to explain the present invention.

As shown in FIG. 6a, points of contact 16a and 16b of the flange 15' are connected to each other by a cord $C_1$, points of contact 16c and 23b of the body 25 by a cord $C_2$, while the point of contact 23c is connected to a cord $C_3$ and the point of contact 23a to a cord $C_4$ respectively.

Accordingly, when the sensor rod 12 is not displaced, a power source E is connected to an infrared light emitting diode 43 in an electrified state. Said power source E and said infrared light emitting diode 43 are connected to each other by means of an integrated circuit (IC) as shown in FIG. 7. The integrated circuit (IC) is housed in the space of a casing 4 as shown in FIG. 5.

Figure 6B:
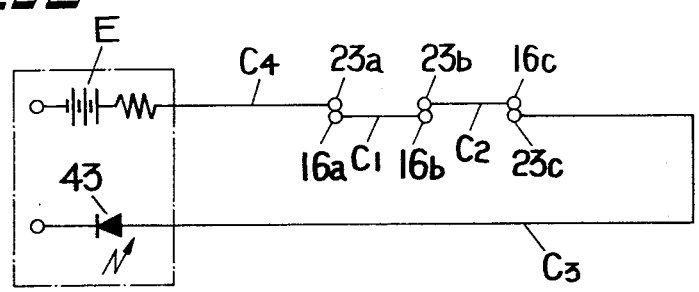
FIG. 6b is a wiring diagram showing the wiring of FIG. 6a to explain the present invention.

In FIG. 7, when a sensor rod 12 is not displaced, the Schmidt trigger circuit 42 is maintained in an electrified state through an amplifier 41 by the input signals from a power source E and thereby the infrared light emitting diode 43 is permitted to radiate. Said infrared light emitting diode 43 is mounted at the top of the support body 26 (the portion shown under reference numeral 29 in FIG. 1), and correspondingly therewith a phototransistor 44 is provided at the top of a support member on the casing side. Therefore, when the sensor rod 12 is displaced as a result of contacting the workpiece W, a series of circuits shown in FIG. 6b are closed, the input signals to be put in the Schmidt circuit 42 from the power source E change, the Schmidt circuit 42 remains in an unelectrified state, the light emitting signals of the infrared light emitting diode 43 is quenched, the resistance value at the phototransistor 44 which receives the quenching signals changes, and thus changed signals are transmitted, for example, to the control device 34 of the machining center as shown in FIG. 7, and finally the position to be worked can be detected by the commands from this control device.

What is claimed is:

1. A touch sensor comprising: a holder; a casing integrally connected to the holder; a plunger and sensor rod disposed coaxially in the casing; a contact at one end of the sensor rod and projecting from the casing; a radial flange integrally connected to the other end of the sensor rod; means mounting the plunger comprising slide ball bearings to enable the plunger to move freely in its axial direction and means biasing the plunger towards the sensor rod; a universal joint between the plunger and the other end of the sensor rod; and means fixed on the casing and in engagement with a peripheral portion of the flange for producing a signal representative of the movement of the contact.

2. A touch sensor as defined in claim 1 wherein said holder comprises a tapered shank portion releasable connectable to a main spindle of a machine and a grasping portion which is graspable by a manipulator.

3. A touch sensor as defined in claim 1, wherein the means fixed on the casing comprises at least three spaced apart terminals connected to a sensing device and against which the flange rests.

4. A touch sensor as defined in claim 3, further comprising an annular connecting terminal connected to the sensing device and disposed at the peripheral portion of the flange and aligned with said at least three terminals.

5. A touch sensor as defined in claim 4, wherein said sensing device comprises light emitting means connected to said terminals provided on the flange and the casing, and photo-receiving means which receives the light radiated by said light emitting means.

6. A touch sensor as defined in claim 3, further comprising at least three contacts connected to the sensing device and disposed at the peripheral portion of the flange aligned with said at least three terminals.

7. A touch sensor as defined in claim 3, wherein said sensing device comprises an induction transformer having a primary winding connected to a power source and a secondary winding connected to said at least three terminals.

8. A touch sensor as defined in claim 1, wherein the universal joint comprises a tapered concavity provided at the opposing ends of the plunger and the sensor rod and a sphere inserted between these tapered concavities.

9. A touch sensor as defined in claim 1, wherein the universal joint comprises a tapered concavity provided at one end portion of the plunger and a sphere provided at the other end portion of the sensor rod which opposes to said concavity.

10. A touch sensor as defined in claim 1, wherein the universal joint comprises a sphere provided at one end portion of the plunger and a tapered concavity provided at the other end portion of the sensor rod which opposes to said plunger.

* * * * *